United States Patent
Steenbakkers-Menting et al.

(10) Patent No.: US 11,879,026 B2
(45) Date of Patent: *Jan. 23, 2024

(54) PROPYLENE-BASED TERPOLYMER COMPOSITION FOR PIPES

(71) Applicant: SABIC GLOBAL TECHNOLOGIES B.V., Bergen Op Zoom (NL)

(72) Inventors: Henrica Norberta Alberta Maria Steenbakkers-Menting, Geleen (NL); Patrick Elisabeth Luc Voets, Geleen (NL); Desiree Marie Louise Seegers, Geleen (NL); Erik Delsman, Geleen (NL); Ibrahim Mohammad Alsugai, Geleen (NL); Musaad Al-Sadhan, Geleen (NL); Martin Alexander Zuideveld, Geleen (NL); Akhlaq Moman, Geleen (NL)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 376 days.

This patent is subject to a terminal disclaimer.

(21) Appl. No.: 17/260,669

(22) PCT Filed: Jul. 22, 2019

(86) PCT No.: PCT/EP2019/069636
§ 371 (c)(1),
(2) Date: Jan. 15, 2021

(87) PCT Pub. No.: WO2020/020808
PCT Pub. Date: Jan. 30, 2020

(65) Prior Publication Data
US 2021/0292448 A1 Sep. 23, 2021

(30) Foreign Application Priority Data

Jul. 27, 2018 (EP) .................................. 18185939

(51) Int. Cl.
| | |
|---|---|
| *C08F 210/16* | (2006.01) |
| *C08L 23/16* | (2006.01) |
| *C08F 210/06* | (2006.01) |
| *C08F 210/02* | (2006.01) |
| *C08F 210/14* | (2006.01) |
| *F16L 9/12* | (2006.01) |

(52) U.S. Cl.
CPC .......... *C08F 210/06* (2013.01); *C08F 210/02* (2013.01); *C08F 210/14* (2013.01); *C08F 210/16* (2013.01); *F16L 9/12* (2013.01); *C08F 2500/36* (2021.01); *C08L 23/16* (2013.01)

(58) Field of Classification Search
CPC .. C08F 210/16; C08F 210/06; C08F 2500/36; C08F 2500/04; C08F 2500/12
See application file for complete search history.

(56) References Cited

U.S. PATENT DOCUMENTS

| | | | |
|---|---|---|---|
| 4,579,836 A | 4/1986 | Azoumanidis et al. | |
| 8,017,206 B2 * | 9/2011 | De Palo | B32B 27/32 525/240 |
| 8,785,584 B2 * | 7/2014 | Cavalieri | C08J 5/18 526/348 |
| 8,993,703 B2 * | 3/2015 | Marzolla | C08F 210/06 526/348 |
| 9,006,368 B2 * | 4/2015 | Marzolla | C08F 210/06 526/348 |
| 9,487,649 B2 * | 11/2016 | Galvan | B32B 27/32 |
| 9,988,523 B2 * | 6/2018 | Tranninger | C08L 23/142 |
| 10,316,123 B2 * | 6/2019 | Destro | C08F 210/06 |
| 11,407,867 B2 * | 8/2022 | Massari | B32B 27/18 |
| 2012/0095174 A1 | 4/2012 | Marin et al. | |
| 2014/0332109 A1 * | 11/2014 | Cavalieri | C08F 210/06 138/140 |
| 2015/0299445 A1 * | 10/2015 | Cavalieri | C08L 23/20 525/240 |
| 2015/0322179 A1 * | 11/2015 | Galvan | C08F 210/06 526/128 |
| 2016/0145365 A1 * | 5/2016 | Destro | C08F 210/06 428/36.92 |

(Continued)

FOREIGN PATENT DOCUMENTS

| | | |
|---|---|---|
| EP | 2653496 A1 | 10/2013 |
| EP | 3064548 A1 | 9/2016 |
| WO | 2006002778 A1 | 1/2006 |
| WO | 2011155999 A1 | 12/2011 |
| WO | 2013083575 A1 | 6/2013 |
| WO | 2018011177 A1 | 1/2018 |
| WO | 2018059955 A1 | 4/2018 |

OTHER PUBLICATIONS

International Search Report for International Application No. PCT/EP2019/069636, International Filing Date Jul. 22, 2019, dated Oct. 29, 2019, 5 pages.

(Continued)

*Primary Examiner* — Rip A Lee
(74) *Attorney, Agent, or Firm* — CANTOR COLBURN LLP

(57) ABSTRACT

The invention relates to a polypropylene composition comprising a terpolymer containing propylene, ethylene and 1-hexene wherein the polypropylene composition (i) has a content of ethylene derived units of at least 1.5 wt %; (ii) has a content of 1-hexene derived units of at least 1.5 wt %; (iii) has a melt flow rate of 0.10 to 0.70 g/10 min determined by ISO 1133-1:2011 (230° C., 2.16 kg); and (iv) has a ratio of weight average molecular weight (Mw) to numeric average molecular (Mn) weight of the terpolymer of 7.0 to 20.0, wherein Mw and Mn are measured according to ASTM D6474-12.

20 Claims, No Drawings

(56) References Cited

U.S. PATENT DOCUMENTS

2017/0327613 A1* 11/2017 Ciarafoni ................. B65D 1/02
2021/0214540 A1 7/2021 Steenbakkers-Menting et al.

OTHER PUBLICATIONS

Written Opinion for International Application No. PCT/EP2019/069636, International Filing Date Jul. 22, 2019, dated Oct. 29, 2019, 6 pages.
Escher et al.; "Carbon Nuclear Magnetic Resonance of Ethylene-Propylene-1-hexene Terpolymers", Journal of Polymer Science: Part A: Polymer Chemistry, vol. 42; 2004; pp. 2474-2482.

* cited by examiner

PROPYLENE-BASED TERPOLYMER COMPOSITION FOR PIPES

CROSS REFERENCE TO RELATED APPLICATIONS

This application is a National Stage application of PCT/EP2019/069636, filed Jul. 22, 2019, which claims the benefit of European Application No. 18185939.8, filed Jul. 27, 2018, both of which are incorporated by reference in their entirety herein.

The invention relates to a polypropylene composition comprising a terpolymer, to the use of the polypropylene composition and to articles, preferably pipes, comprising the polypropylene composition.

Polypropylene-based polymers have many characteristics which make them suitable for many applications, for instance pipes such as hot and cold water pressure pipes. For hot and cold water pressure pipes, it is especially important that such pipes show a long time to brittle failure especially at elevated temperatures in combination with a good impact resistance. The long time to brittle failure is necessary to ensure the lifetime of the pipe during use. A good impact resistance is very important during the handling (installation, transportation etc) of the pipe.

Attempts have been made to achieve favorable properties by using different types of comonomers and varying process conditions.

Use of propylene/ethylene/1-hexene terpolymers is known in the art for the production of pipes. For example WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt. WO2013/083575 discloses a terpolymer containing propylene, ethylene and 1-hexene wherein: (i) the content of 1-hexene derived units ranges from 1 wt % to 3.2 wt %, (ii) the content of ethylene derived units is higher than 1.4 wt %% and C2 content<C6 content −0.2, further defined by the MFR and the melting temperature.

There is still a need in the art for a propylene-based terpolymer composition having a good combination of a high impact resistance and a long time to brittle failure.

It is an objective of the present invention to provide a propylene/ethylene/1-hexene terpolymer composition having a good combination of a high impact resistance and a long time to brittle failure.

Accordingly, the invention provides a polypropylene composition comprising a terpolymer containing propylene, ethylene and 1-hexene, wherein the polypropylene composition (i) has a content of ethylene derived units of at least 1.5 wt %;
(ii) has a content of 1-hexene derived units of at least 1.5 wt %;
(iii) has a melt flow rate of 0.10 to 0.70 g/10 min determined by ISO 1133-1:2011 (230° C., 2.16 kg); and
(iv) has a ratio of weight average molecular weight (Mw) to numeric average molecular (Mn) weight of the terpolymer of 7.0 to 20.0, wherein Mw and Mn are measured according to ASTM D6474-12.

It was surprisingly found that the polypropylene composition according to the invention has a good combination of the time to brittle failure and the impact property. In addition, the pipes prepared from the terpolymer of the invention may be extruded at higher speeds, which means that the pipes can be produced at a higher throughput and/or by using less energy, which is advantageous from both an environmental as well as from a cost perspective.

The term "pipe" as used herein also includes pipe fittings, valves and all parts which are commonly necessary for e.g. a hot water piping system. Also included within the definition are single and multilayer pipes, where for example the pipe may include one or more metal layers and may include one or more adhesive layers.

Polypropylene Composition

The polypropylene composition of the invention may further comprise additives. Preferably, the polypropylene composition according to the invention does not comprise polymers other than the terpolymer. Preferably, the sum of the amount of the terpolymer and the additives is 100 wt % based on the polypropylene composition.

Additives suitable for use in pipes include but are not limited to nucleating agents, stabilizers, anti-oxidants pigments and/or colorants, impact modifiers, flame retardants, acid scavengers, anti-microbials and the like. Such additives are well known in the art. The skilled person will choose the type and amount of additives such that they do not detrimentally influence the aimed properties of the composition.

Preferably, the amount of the additive in the composition is chosen from 0 to 5 wt % based on the total weight of the polypropylene composition (the polypropylene composition comprises 95 to 100 wt % of the terpolymer), preferably the amount of additive is from 0.01 to 3 wt %, for example from 0.1 to 2 wt %, based on the total weight of the polypropylene composition.

The melt flow rate (MFR) (ISO 1133-1:2011, 230° C., 2.16 kg) of the composition according to the invention is 0.10 to 0.70 dg/min, preferably 0.10 to 0.50 dg/min, more preferably 0.10 to 0.30 dg/min, The content of ethylene derived units in the composition according to the invention is at least 1.5 wt %. This ensures that a good impact property is obtained. The content of ethylene derived units in the composition is preferably 1.5 to 5.0 wt %, more preferably 1.6 to 4.0 wt %, for example 1.7 to 3.5 wt %.

The content of 1-hexene derived units in the composition according to the invention is at least 1.5 wt %. This ensures a high resistance to brittle failure and a high resistance to hydraulic pressure. The content of 1-hexene derived units in the composition according to the invention is preferably 1.5 to 5.0 wt %, more preferably 1.6 to 4 wt %, for example 1.7 to 3.5 wt %.

Preferably, the content of ethylene derived units in the polypropylene composition in wt % is larger than the content of 1-hexene derived units in the polypropylene composition in wt %—0.20 wt %. More preferably, the content of ethylene derived units in the polypropylene composition in wt % is larger than the content of 1-hexene derived units in the polypropylene composition in wt %—0.10 wt %. More preferably, the content of ethylene derived units in the polypropylene composition in wt % is larger than the content of 1-hexene derived units in the polypropylene composition in wt %.

The ratio of the content of ethylene derived units to the content of 1-hexene derived units in the composition according to the invention is at least 0.70, preferably at least 0.80, more preferably at least 0.90, and preferably at most 3.0, preferably at most 2.5. This leads to a good balance of the impact property and the resistance to failure.

The contents of ethylene derived units and 1-hexene derived units in a polypropylene composition may e.g. be determined by the method described herein in the section titled "13C-NMR for C2, C6 comonomer content".

Mw and Mn of the composition according to the invention are measured according to ASTM D6474-12. Further details of the measurement method are described in the experimental section.

Preferably, the weight average molecular weight of the composition according to the invention is 500 to 1500 kg/mol, more preferably 650 to 1100 kg/mol measured according to ASTM D6474-12. Further details of the measurement method are described in the experimental section.

Preferably, the numeric average molecular weight of the composition according to the invention is 70 to 110 kg/mol, more preferably 80 to 105 kg/mol measured according to ASTM D6474-12. Further details of the measurement method are described in the experimental section.

The ratio of weight average molecular weight to numeric average molecular weight (Mw/Mn) of the composition according to the invention is 7.0 to 20.0, preferably 7.0 to 16.0, more preferably 8.0 to 14.0. Such a relatively high Mw/Mn leads to a good processability.

Preferably, the composition according to the invention has an XS of at most 10 wt % based on the terpolymer. XS stands for the amount of xylene solubles which are measured using the conditions as described in the experimental section of the present application.

Preferably, the composition according to the invention has $<G_p>/Y$ of at least 7.0, more preferably at least 7.5, more preferably at least 8.0, wherein $<G_p>$ is strain hardening modulus and Y is yield stress and $<G_p>/Y$ is determined by:
  a) providing a specimen of the composition by compression molding a sheet from the composition according to ISO 1873-2 to a thickness of 0.3 mm±0.025 mm and punching a specimen having a geometry of the test specimen described in ISO/DIS 18488 from the sheet, wherein the sheet is annealed after the compression molding and before the punching at a temperature of 100° C. for 1 hour and cooled down to room temperature,
  b) elongating the specimen at a constant traverse speed of 20 mm/min at 100° C.,
  c) measuring the load sustained by the specimen during the elongation to obtain a stress-strain curve and measuring the yield stress Y,
  d) calculating true stress-true strain curve from the stress strain curve obtained by step c) and calculating the tensile strain hardening modulus $<G_p>$ from the true stress-strain curve, according to the method as described in ISO/DIS 18488 and
  e) calculating a quotient of the tensile strain hardening modulus $<G_p>$ divided by the yield stress Y.

Preferably, the composition according to the invention has a polydispersity index (PI) of at least 4.0, preferably at least 5.0. The determination method of the polydispersity index is described in the experimental section. Such a relatively high PI leads to a good processability.

Preferably, the lowest temperature at which maximum 1 out of 10 pipes made from the composition according to the invention fails determined by DIN8078 is 0.0° C., preferably −1.0° C., more preferably −2.0° C.

Preferably, a pipe prepared from the composition according to ISO 1167-2 has a run time without failure of at least 5000 h measured according to ISO1167-1 at a temperature of 95° C. and a hoop stress calculated according to ISO3213 of 4.4 MPa.

Preferably, a pipe prepared from the composition according to ISO 1167-2 has a run time without failure of at least 1000 h measured according to ISO1167-1 at a temperature of 95° C. and a hoop stress calculated according to ISO3213 of 4.9 MPa Preferably, the terpolymer of the composition according to the invention is of a unimodal type.

It is herein understood that the term 'unimodal terpolymer' is a terpolymer which is unimodal with respect to molecular weight distribution and comonomer content whereby the copolymer can be polymerised in a single stage batch or preferably a continuous process. The polymerization can be a slurry or gas phase, preferably a gas phase technology, e.g. fluidized bed or horizontally stirred reactor.

The unimodal terpolymer is preferably produced in one reactor. However, the unimodal terpolymer may also be produced in a multistage process using, at each stage, process conditions which result in similar polymer properties. The process conditions are substantially the same in these stages, meaning that temperature, pressure, concentrations of the reactants and the catalysts are substantially the same, for example the deviations in each of these conditions is not more than 10%.

The use of a one stage polymerization process is advantageous since it is a simple process using only one reactor.

The invention further provides a process for the preparation of the polypropylene composition according to the invention, comprising preparing the terpolymer according to the invention polymerizing propylene, ethylene and 1-hexene in the presence of a Ziegler-Natta catalyst system.

The process for the preparation of the polypropylene composition according to the invention may further comprising mixing the terpolymer according to the invention with additives.

The Ziegler-Natta catalyst system comprises a solid, titanium-containing component in combination with at least one aluminum alkyl cocatalyst, and preferably an external donor. Examples of the suitable catalyst systems are described in WO2011/155999, on page 7, line 16 to page 10, line 6; and page 10, line 31 to page 13, line 14 incorporated herein by reference.

Further examples of the suitable catalyst systems are described in WO2018059955. The preferred Ziegler-Natta catalyst system comprises a procatalyst, a co-catalyst and optionally an external electron donor, wherein the procatalyst id obtained by a process comprising the steps of
  Step A) providing or preparing a compound $R^4_z MgX^4_{2-z}$ wherein
    $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;
    $X^4$ is independently selected from the group consisting of fluoride (F—), chloride (Cl—), bromide (Br—) or iodide (I—), preferably chloride;
    z is in a range of larger than 0 and smaller than 2, being 0<z<2;
  Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein
    $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;

$X^1$ is independently selected from the group consisting of fluoride (F—), chloride (Cl—), bromide (Br—) or iodide (I—), preferably chloride;

n is in range of 0 to 4, preferably n is from 0 up to and including 1;

z is in a range of larger than 0 and smaller than 2, being 0<z<2;

x is in a range of larger than 0 and smaller than 2, being 0<x<2;

Step C) activating said solid support, comprising two sub steps:

Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and Step C2) a second activation step by contacting the activated solid support obtained in step C1) with an activating electron donor; to obtain a second intermediate reaction product;

Step D) reacting the second intermediate reaction product obtained step C2) with a halogen-containing Ti-compound, optionally an activator prior to or simultaneous with the addition of an internal donor, and at least one internal electron donor to obtain said procatalyst.

The further preferred examples of the procatalyst are mentioned in the claims of WO2018059955, incorporated by reference. Particularly preferred procatalyst is catalyst H used in Example 8 of WO2018059955.

These catalyst systems of WO2018059955 are phthalate-free. This has the advantage that undesired phthalates will not end up in the drinking water transported by a pipe made by the composition according to the invention. Therefore, preferably, the composition of the invention as well as any articles comprising such composition, such as the pipes of the invention, are essentially phthalate-free. For purposes of the invention, essentially phthalate-free is defined as the presence of less than 0.0001 wt % of phthalates based on the composition, preferably 0.00000 wt % of phthalates based on the composition.

Preferably, the terpolymer is prepared using the Ziegler-Natta catalyst system according to the catalyst system of claim 12 of WO2018059955. If the terpolymer has a first terpolymer fraction and a second terpolymer fraction, one or both (preferably both) of the first terpolymer fraction and the second terpolymer fraction are prepared using the Ziegler-Natta catalyst system according to the catalyst system of claim 12 of WO2018059955.

The hydrogen concentrations in the reaction conditions may be selected according to known criteria such that desired molecular weights of the respective fractions are obtained.

The amounts of ethylene and 1-hexene with respect to the amount of propylene to be fed to the reactor may be selected according to known criteria such that desired amounts of ethylene and 1-hexene in the polymer are obtained.

Conditions for the polymerization, such as temperature and time, pressures of the monomers, avoidance of contamination of catalyst and the use of additives to molecular weights are known to the skilled person. The temperature should be selected to ensure reasonable copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin copolymerization according to this invention is carried out at monomer pressures of about atmospheric or above. Generally, monomer pressures range from about 1.2 to about 40 bar (120 to 4000 kPa), more typically 18 to 26 bar.

The copolymerization time will generally range from about ½ to several hours in batch processes with corresponding average residence times in continuous processes.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

After polymerization, polymer powder is removed from the polymerization reactor by methods known to the art, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processed by the extruder, polymer powder may be contacted with air or water vapor to deactivate any remaining catalytic species.

In another aspect, the invention relates to the composition obtained or obtainable by the process of the invention.

In another aspect, the invention relates to a pipe comprising the composition of the invention, more preferably to a pipe comprising at least 90 wt %, for example at least 95 wt %, for example at least 99 wt % of the composition of the invention based on the pipe, more preferably to a pipe consisting of the composition of the invention.

In another aspect, the invention relates to the use of the composition of the invention for the preparation of pipes.

In another aspect, the invention relates to a process for the preparation of the pipe of the invention, comprising the step of providing the composition of the invention.

The person skilled in the art is aware of how to operate a pipe extrusion process. For example, the pipe of the invention may be produced by first melting the polypropylene composition of the instant invention in an extruder at temperatures in the range of from 200 to 300° C. and then extruding it through an annular die and cooling it.

The extruders for producing the pipe can for example be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Depending on the desired size of the pipe, ring shaped dies with diameters ranging from approximately 16 to 2000 mm and even greater are possible.

For example, the melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Methods

SEC: Mz, Mn, Mw

Size Exclusion Chromatography (SEC) was performed on the granule samples and Mw, Mn and Mz were all measured in accordance with ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight. Mz stands for the z-average molecular weight.

In addition to the method specified by ASTM D6474-12, the method was performed using a configuration in which a Polymer Char IR5 infrared concentration detector and a Polymer Char online viscosity detector was used to gain 'absolute' (and therefore more accurate) molar masses. Three columns of Polymer Laboratories 13 µm PLgel Olexis, 300×7.5 mm were used in series with 1,2,4-trichlorobenzene stabilized with 1 g/L butylhydroxytoluene (also known as 2,6-di-tert-butyl-4-methylphenol or BHT) as elution.

The molar mass distribution and derived molar masses were determined based on a calibration using linear PE standards (narrow and broad (Mw/Mn=4 to 15)) in the range of 0.5-2800 kg/mol. Samples of polymer granules were mixed with Tris (2,4-di-tert-butylphenyl)phosphite (Irgafos 168) and 1,1,3-Tris (2-methyl-4-hydroxy-5-tert-butylphenyl)butane (Topanol CA) in a weight ratio of sample:Irgafos:Topanol of 1:1:1, after which the mixture thus obtained was dissolved in 1,2,4-trichlorobenzene stabilized with 1 g/L BHT until the concentration of the mixture in 1,2,3-trichlorobenzene stabilized with 1 g/L BHT was 0.03 wt %.

Xylene Solubles (XS)

Powder samples were evaluated for XS, wt % xylene solubles, 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes place with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

13C-NMR for C2, C6 Comonomer Content

Approximately 150 mg of sample was dissolved at ~135° C. in ~3 ml of 1,1,2,2-tetrachloroethane-d2 (TCE-d2)/BHT stock solution using a 10 mm NMR tube. The stock solution was made by dissolving ~5 mg on BHT in 25 ml of TCE-d2. Oxygen concentration in the tube was reduced by flushing the tube for ~1 min with nitrogen before dissolution. The sample was periodically checked for homogeneity and manually mixed as necessary.

All NMR experiments were carried out on a Bruker 500 Avance III HD spectrometer equipped with a 10 mm DUAL (proton and carbon) cryogenically cooled probe head operating at 125° C. The 13C NMR measurements were performed using a spectral width of 220 ppm, an acquisition time of ~1.4 s and a relaxation delay of 20 s between each of the 512 transients. The spectra were calibrated by setting the central signal of TCE's triplet at 74.2 ppm.

Commoner content is calculated as described in: F. F. N. Escher, G. B. Galland, J Polym Sci Part A: Polym Chem 42: 2474-2482, 2004

Dynamic Mechanical Spectroscopy (DMS) Analysis for PI (Polydispersity Index)

Compression moulding of the samples was done at 200° C. in consecutive steps; at 0 bar for 1 minute, at 5 bars for 1 minute, at 40 bars for 3 minutes and was completed by a cooling step at 40 bars. The rheological behavior of the samples was studied using a DHR2 torsional rheometer (TA Instruments) equipped with a parallel plate geometry (diameter=25 mm, gap=1000 µm). The rheological profiles were obtained by conducting oscillation frequency sweep experiments. The measurements were performed with the following procedure:

a) Conditioning step at 230° C. for 60 seconds
b) Oscillation frequency sweep at 230° C.: frequency 600-0.01 rad/s, 1% strain, logarithmic sweep, 5 pts/decade.

Distorted torque-displacement data points were determined for each sample. Using the Cox-Merz rule and the Trios software, the undistorted rheology data collected in oscillation mode were transformed to the ones in flow mode. The transformed rheological curves were fitted using Yasuda-Carreau model from which a zero-shear viscosity value was obtained. From these, the rheology polydispersity index (PI) of the blends was determined by dividing the cross-over modulus (which occurs when the storage (G') and loss (G") moduli are equal) into 105 Pa as per definition. This is a convenient measure of polydispersity that is often employed. The PI value could be determined for all polymer blends without the need of extrapolating the cross-over point. PI is calculated as follows:

$$PI = \frac{10^5 Pa}{G_c} \text{ where } G_c \text{ occurs when } (G') \text{ storage modulus} = (G'') \text{ loss modulus}$$

Melt Flow Rate (MFR)

For purpose of the invention the melt flow rate is the melt flow rate as measured according to ISO1133 (2.16 kg/230° C.).

<Gp>/Ys

Strain hardening modulus divided by yield stress (<Gp>/Ys) were measured by the method described in WO2018/011177:
  a) providing a specimen of the composition by compression molding a sheet from the composition according to ISO 1873-2 to a thickness of 0.3 mm±0,025 mm and punching a specimen having a geometry of the test specimen described in ISO/DIS 18488 from the sheet, wherein the sheet is annealed after the compression molding and before the punching at a temperature of 100° C. for 1 hour and cooled down to room temperature,
  b) elongating the specimen at a constant traverse speed of 20 mm/min at 100° C.,
  c) measuring the load sustained by the specimen during the elongation to obtain a stress-strain curve and measuring the yield stress Y,
  d) calculating true stress-true strain curve from the stress strain curve obtained by step c) and calculating the tensile strain hardening modulus <$G_p$> from the true stress-strain curve, according to the method as described in ISO/DIS 18488 and
  e) calculating a quotient of the tensile strain hardening modulus <$G_p$> divided by the yield stress Y.

Steps b) and c) were performed as follows:

Measurement of the exact dimensions (with accuracy of 0.01 mm) of width (b) and (with an accuracy of 0.005 mm) of thickness (h) of each individual test specimen.

Conditioning of the test specimens for a period of time, e.g. at least 30 minutes, in the temperature chamber set at a predetermined temperature of 100° C. prior to starting the test.

Clamping of the test piece in the upper grip of the elongation device. The clamps are chosen to avoid damage and slippage of the test piece.

Closure of the temperature chamber.

After reaching said predetermined temperature, clamp the test piece with the lower grip.

The sample shall remain between the clamps for a certain period, e.g. at least 1 minute, before the load is applied and measurement starts.

Add a pre-stress e.g. of 0.4 MPa reached with a speed of e.g. 5 mm/min.

During the test, the load sustained by the specimen and the elongation are measured.

Extend the test specimen at a constant traverse speed of 20 mm/min until the test specimen breaks.

For step d), the method of the calculations is described in ISO/DIS 18488, section 8 "Data treatment".

The draw ratio, λ, is calculated from the length, l, and the gauge length, $l_0$, as shown by formula 1.

$$\lambda = \frac{l}{l_0} = 1 + \frac{\Delta l}{l_0} \quad (1)$$

where

Δl is the increase in the specimen length between the gauge marks.

The true stress, $\sigma_{true}$, is calculated according to formula 2, which is derived on the assumption of conservation of volume between the gauge marks:

$$\sigma_{true} = \lambda \cdot \frac{F}{A} \quad (2)$$

where

F is the measured force (N).

It is important that the initial cross section A shall be determined for each individual test bar.

The Neo-Hookean constitutive model (formula 3, see Annex A of ISO/DIN 18488) is used to fit and extrapolate the data from which <Gp> (MPa) for 8<λ<12 is calculated.

$$\sigma_{true} = \frac{<G_p>}{20} \cdot \left(\lambda^2 - \frac{1}{\lambda}\right) + C \quad (3)$$

where

C is a mathematical parameter of the constitutive model describing the yield stress extrapolated to λ=0.

Accuracy of fit of data (R2) greater than 0.9 shall be achieved.

The measurement of $G_p$/Y was performed on test specimens made according to ISO1873-2 and ISO/DIS18488 at a constant traverse speed of 20 mm/min and a temperature of 100° C.

Pipe Impact Measurements

Pipe impact measurements are performed according to DIN 8078. The temperature shown is the lowest temperature at which at maximum 1 out of 10 pipes fails.

Hydrostatic Pipe Testing

For measuring the resistance to internal pressure, a pipe was prepared from the propylene copolymer composition according to ISO 1167-2:2006. According to ISO1167-1:2006, a run time without failure of the pipe was measured while a hoop stress of 4.9 MPa or 4.4 MPa measured according to ISO3213:2009 was applied to the pipe at a temperature of 95° C.

Experiments

The catalyst used for the polymerization was catalyst H (Ex. 8) of WO2018/059955. The composition of the solid catalyst H produced is given in Table 1.

TABLE 1

Composition of solid catalyst H

| Catalyst | Example | d50 [μm] | Mg [%] | Ti [%] | ID [%] | Activator (EB) [%] | EtO [%] |
|---|---|---|---|---|---|---|---|
| H | 8 | 22.16 | 19.65 | 2.40 | 8.41 | 6.68 | 1.48 |

Polymerization experiments of propylene terpolymers were performed on a bench-scale gas-phase reactor using above described catalyst.

Polymerization experiments of propylene terpolymers were performed on gas phase fluidized bed polymerization reactor using above described catalyst. The reactor conditions and feed are described in table 2 below. Comparative example 1 is the propylene random copolymer P9421, which is commercially available from SABIC.

TABLE 2

Process conditions.

| Exp Nr. | | Ex. 1 | Ex. 2 | Comp 1. | Comp. 2 |
|---|---|---|---|---|---|
| TEAL/SCA | molar ratio | 2.1 | 3 | | |
| TEAl/Ti | molar ratio | 110 | 110 | | 110 |
| T | C. | 66 | 66 | | 66 |
| P | Barg | 26 | 26 | | 26 |
| H2/C3 | mol/mol | 0.0026 | 0.0029 | | 0.0030 |
| C2/C3 | mol/mol | 0.0140 | 0.0142 | | 0.0110 |
| C6/C3 | mol/mol | 0.0015 | 0.0010 | | 0.02 |
| XS powder | M/M % | 8.2 | 7.2 | 9.2 | 4.9 |
| TC2 | wt-% | 2.2 | 2.2 | 3.7 | 1.4 |
| TC6 | wt-% | 2 | 1.6 | | 2.1 |
| TC2 | mol % | 3.30 | 3.29 | 5.4 | |
| TC6 | mol % | 1.00 | 0.80 | — | |
| Mw/Mn | — | 11.2 | 11.0 | 6.8 | |

SCA = Selectivity Control Agent = ADT5500

The powder was collected and granulate was prepared by melt-mixing the powders with the appropriate additives in a double screw extruder. The additives (antioxidants, acid scavengers) were used in an amount of 1.05 wt % based on the powder and mixed prior to dosing to the extruder. The temperature profile in the extruder was 20-79-190-230-230-230-230-230-230-235-235-240-240° C. at a throughput of 74 kg/h at 225 rpm.

Preparation of the Pipe

20×3.4 mm pipes were extruded on a Reifenhauser S50 I with a barrier screw operated at 35 rpm. The die head temperature profile was set to 40/190/200/205/20500 and temperature profile of the extruder was set to 205/205/205/20500. The extruded pipes were cooled to a temperature of 2000. The pressure sensor to measure the 'melt pressure' (indicated in the table below) was located in between the extruder and the die head.

TABLE 3

Results

| Exp Nr. | | Ex. 1 | Ex. 2 | Comp 1. | Comp. 2 |
|---|---|---|---|---|---|
| MFI 2.16 kg | dg/min | 0.17 | 0.189 | 0.3 | 0.14 |
| MFI 5 kg | dg/min | 1.07 | 1 | | |
| MFI 10 kg | dg/min | 5.6 | 5.43 | | |
| PI (gran) | | 5.6 | 5.6 | 3.4 | |
| <Gp>/Ys @100° C. | — | 9.6 | 8.4 | 6.00 | |
| pipe impact | ° C. | -2 | -1 | -3 | 2 |
| Pipe pressure 95° C., 4.9 Mpa | hr | >8900 | 1350 (D*) | 25 (D*) | |
| Pipe pressure 95° C., 4.4 Mpa | hr | >8904 | >8904 | 1827 (D*) | |

*D = ductile failure

It can be concluded from Table 3 that the time to failure is much longer for a pipe made from the composition according to the invention. A higher C2 content leads to a better pipe impact property. The pipe made from the composition according to the invention has a sufficient pipe impact property.

TABLE 4 pipe processing results

| Sample | RPM (min-1) | Throughput (kg/h) | Uptake (m/min.) | Melt pressure (kp/cm$^2$) | Temperature (° C.) |
|---|---|---|---|---|---|
| Comp 1 | 40 | 34.7 | 3.5 | 136 | 220 |
| Ex. 2 | 60 | 42.1 | 4.3 | 136 | 224 |

It can be concluded from Table 4 that pipe processing is improved for the compositions according to the invention, which can be attributed to a higher Mw/Mn and a higher PI.

Polymerization experiments of propylene terpolymers Ex, 3, Ex. 4 and Comp. 3 were performed on a gas phase polymerization reactor different from the reactor used for the polymers of Ex. 1 and 2 using above described catalyst (catalyst H (Ex. 8) of WO2018/059955). The reactor conditions and feed are described in Table 5. Measured properties of the propylene terpolymers are described in Table 6.

For the determination of the C2, C6 comonomer content for Ex. 3, Ex. 4 and Comp. 3, FT-IR calibrated by NMR was used as follows:

3.75 gram of powder was melt-pressed at 190° C. and 100 kN for 2 minutes into disc film with a diameter of 12.5 cm and a thickness of 0.3 mm. After melt-pressing, the sample was removed from the hot melt press into a cold melt press and kept under a pressure of 100 kN for 2 minutes at 23° C. All spectra were recorded in transmittance mode with a Perkin Elmer Spectrum One spectrometer equipped with a motor that rotates the sample films. For quantification of C2 and C6 the wavenumber range 760-680 cm-1 was taken. The peak at 732 cm-1 is due to C2 and the peak at 726 cm-1 to C6. These two bands show strong overlap, therefore a multivariate regression method was used for deconvolution of the spectral signals and subsequent modelling of the relationship between the spectral responses and the C2 and C6 concentration of the samples. NMR was used as reference method.

Any deviations in the C2, C6 comonomer contents determined by this method and the C2, C6 comonomer contents determined by the method described in the section titled "13C-NMR for C2, C6 comonomer content" are within experimental error.

Other properties mentioned in Tables 5 and 6 were measured by the methods described above.

TABLE 5

Process conditions.

| Exp Nr. | | Ex. 3 | Ex. 4 | Comp. 3 |
|---|---|---|---|---|
| TEAL/SCA | molar ratio | 2 | 2 | 2 |
| TEAl/Ti | molar ratio | 30 | 30 | 30 |
| T | C. | 66 | 66 | 66 |
| P | Barg | 20 | 20 | 20 |
| H2/C3 | mol/mol | 0.0073 | 0.0061 | 0.0058 |
| C2/C3 | mol/mol | 0.014 | 0.0148 | 0.0145 |
| C6/C3 | mol/mol | 0.0141 | 0.0126 | 0.0105 |
| XS powder | M/M % | 5.13 | | |
| TC2 | wt-% | 2.25 | 2.1 | 2.1 |
| TC6 | wt-% | 2.05 | 1.6 | 1.3 |

SCA = Selectivity Control Agent = Diisopropyldimethoxysilane

The powder was collected and granulate was prepared by melt-mixing the powders with the appropriate additives in a double screw extruder. The additives (antioxidants, acid scavengers) were used in an amount of 1.05 wt % based on the powder and mixed prior to dosing to the extruder. Temperature profile of the extruder was: –, 20, 20, 20, 100, 70, 200, 220-240° C., throughput of 1.1 kg/h at 223 rpm.

TABLE 6

Results

| Exp Nr. | | Ex 3 | Ex 4 | Comp. 3 |
|---|---|---|---|---|
| MFI 2.16 kg | dg/min | 0.24 | 0.18 | 0.2 |
| <Gp>/Ys @100° C. | — | 9 | 8.4 | 7.8 |

The comparison between Ex. 4 and Comp. 3 shows that the difference in the higher content of 1-hexene derived units leads to a higher <Gp>Ys, which shows that the time to failure of a pipe made from the composition of Ex. 4 is much longer than that made from the composition of Comp. 3. Thus, a pipe made from the composition according to the invention having a relatively high content of 1-hexene derived units has a higher advantageously has a long time to failure.

The invention claimed is:

1. A polypropylene composition comprising a terpolymer containing propylene, ethylene and 1-hexene, wherein the polypropylene composition
   (i) has a content of ethylene derived units of at least 1.5 wt %;
   (ii) has a content of 1-hexene derived units of at least 1.5 wt %;
   (iii) has a melt flow rate of 0.10 to 0.70 g/10 min determined by ISO 1133-1:2011 at 230° C. and 2.16 kg; and
   (iv) has a ratio of weight average molecular weight (Mw) to number average molecular weight (Mn) of the terpolymer of 8 to 16, wherein Mw and Mn are measured according to ASTM D6474-12.

2. The polypropylene composition according to claim 1, wherein the melt flow rate of the polypropylene composition determined by ISO 1133-1:2011 at 230° C. and 2.16 kg is 0.10 to 0.50 dg/min.

3. The polypropylene composition according to claim 1, wherein the melt flow rate of the polypropylene composition determined by ISO 1133-1:2011 at 230° C. and 2.16 kg is 0.10 to 0.30 dg/min.

4. The polypropylene composition according to claim 1, wherein the content of ethylene derived units in the polypropylene composition is 1.5 to 5.0 wt %.

5. The polypropylene composition according to claim 1, wherein the content of ethylene derived units in the polypropylene composition is 1.6 to 4.0 wt %.

6. The polypropylene composition according to claim 1, wherein the content of ethylene derived units in the polypropylene composition is 1.7 to 3.5 wt %.

7. The polypropylene composition according to claim 1, wherein the content of 1-hexene derived units in the polypropylene composition is 1.5 to 4.0 wt %.

8. The polypropylene composition according to claim 1, wherein the content of ethylene derived units in the polypropylene composition in wt % is larger than the content of 1-hexene derived units in the polypropylene composition in wt %-0.20 wt %.

9. The polypropylene composition according to claim 8, wherein the content of ethylene derived units in the polypropylene polypropylene composition in wt % is larger than the content of 1-hexene derived units in the polypropylene polypropylene composition in wt %-0.10 wt %.

10. The polypropylene composition according to claim 1, wherein a ratio of the content of ethylene derived units to the content of 1-hexene derived units in the polypropylene composition is at least 0.70.

11. The polypropylene composition of claim 10, wherein the ratio of the content of ethylene derived units to the content of 1-hexene derived units in the polypropylene composition is at most 3.0.

12. The polypropylene composition according to claim 1, wherein the polypropylene composition has <Gp>/Y of at least 7.0, wherein <Gp> is strain hardening modulus and Y is yield stress and <Gp>/Y is determined by:
   a) providing a specimen of the polypropylene composition by compression molding a sheet from the polypropylene composition according to ISO 1873-2 to a thickness of 0.3 mm±0.025 mm and punching a specimen having a geometry of a test specimen described in ISO/DIS 18488 from the sheet, wherein the sheet is annealed after the compression molding and before the punching at a temperature of 100° C. for 1 hour and cooled down to room temperature,
   b) elongating the specimen at a constant traverse speed of 20 mm/min at 100° C.,
   c) measuring a load sustained by the specimen during the elongating to obtain a stress-strain curve and measuring a yield stress Y,
   d) calculating true stress-true strain curve from the stress strain curve obtained by step c) and calculating a tensile strain hardening modulus <Gp> from the true stress-strain curve, according to the method as described in ISO/DIS 18488 and
   e) calculating a quotient of the tensile strain hardening modulus <Gp> divided by the yield stress Y.

13. The polypropylene composition according to claim 1, wherein the polypropylene composition further comprises additives and a sum of an amount of the terpolymer and the additives is 100 wt % based on the polypropylene composition.

14. A process for the preparation of the polypropylene composition according to claim 1, comprising a step of polymerizing propylene, ethylene and 1-hexene in the presence of a Ziegler-Natta catalyst system to obtain the terpolymer, wherein the Ziegler-Natta catalyst system comprises a procatalyst, a co-catalyst and optionally an external electron donor, wherein the procatalyst is obtained by a process comprising the steps of Step A) providing or preparing a compound $R^4_zMgX^4_{2-z}$ wherein each occurrence of $R^4$ is independently selected from a linear, branched or cyclic hydrocarbyl group independently selected from alkyl, alkenyl, aryl, aralkyl, or alkylaryl groups, and one or more combinations thereof; wherein said hydrocarbyl group is substituted or unsubstituted, and optionally contains one or more heteroatoms;

each occurrence of $X^4$ is independently selected from the group consisting of fluoride (F—), chloride (Cl—), bromide (Br—) and iodide (I—);

z is larger than 0 and smaller than 2, being 0<z<2;

Step B) contacting the compound $R^4_z MgX^4_{2-z}$ with a silane compound $Si(OR^5)_{4-n}(R^6)_n$ to give a first intermediate reaction product, being a solid $Mg(OR^5)_x X^1_{2-x}$ wherein
- $R^5$ and $R^6$ are each independently selected from a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contains one or more heteroatoms;
- each occurrence of $X^1$ is independently selected from the group consisting of fluoride (F—), chloride (Cl—), bromide (Br—) and iodide (I—);
- n is 0 to 4;
- z is larger than 0 and smaller than 2, being 0<z<2;
- x is larger than 0 and smaller than 2, being 0<x<2;

Step C) activating said first intermediate reaction product, comprising two sub steps:
- Step C1) a first activation step comprising contacting the first intermediate reaction product obtained in step B) with at least one first activating compound which is a metal alkoxide compound of formula $M^1(OR^2)_{v-w}(OR^3)_w$ or $M^2(OR^2)_{v-w}(R^3)_w$ to provide a partially activated solid support; wherein: $M^1$ is a metal selected from the group consisting of Ti, Zr, Hf, Al and Si; $M^2$ is Si; v is a valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contains one or more heteroatoms; and a second activating compound which is a first activating electron donor; and
- Step C2) a second activation step comprising contacting the partially activated solid support obtained in step C1) with second activating electron donor; to obtain a second intermediate reaction product;

Step D) reacting the second intermediate reaction product obtained from step C2) with a halogen-containing Ti-compound, at least one internal electron donor, and optionally an activator to obtain said procatalyst.

15. An article comprising the polypropylene composition according to claim 1.

16. The article according to claim 15, wherein the article is a pipe.

17. A method for the preparation of a pipe comprising extruding the polypropylene composition of claim 1.

18. A polypropylene composition comprising a terpolymer containing propylene, ethylene and 1-hexane, wherein the polypropylene composition
(i) has a content of ethylene derived units of at least 1.5 wt %;
(ii) has a content of 1-hexane derived units of at least 1.5 wt %;
(iii) has a melt flow rate of 0.10 to 0.70 g/10 min determined by ISO 1133-1:2011 at 230° C. and 2.16 kg; and
(iv) has a ratio of weight average molecular weight (Mw) to number average molecular weight (Mn) of the terpolymer of 7.0 to 20.0, wherein Mw and Mn are measured according to ASTM D6474-12, wherein the polypropylene composition has a polydispersity index (PI) of at least 4.0.

19. The polypropylene composition according to claim 18, wherein the ratio of weight average molecular weight to number average molecular weight (Mw/Mn) of the terpolymer is 8.0 to 16.0.

20. A polypropylene composition comprising a terpolymer containing propylene, ethylene and 1-hexane, wherein the polypropylene composition
(i) has a content of ethylene derived units of at least 1.5 wt %;
(ii) has a content of 1-hexane derived units of at least 1.5 wt %;
(iii) has a melt flow rate of 0.10 to 0.70 g/10 min determined by ISO 1133-1:2011 at 230° C. and 2.16 kg; and
(iv) has a ratio of weight average molecular weight (Mw) to number average molecular weight (Mn) of the terpolymer of 7.0 to 20.0, wherein Mw and Mn are measured according to ASTM D6474-12, wherein a lowest temperature at which maximum 1 out of 10 pipes made from the polypropylene composition fails determined by DIN8078 is 0.0° C.

* * * * *